Jan. 5, 1954
W. H. HARSTICK
2,665,009
MILK STRAINER WITH REMOVABLE
BAFFLE AND CENTERING DEVICE
Filed June 30, 1951
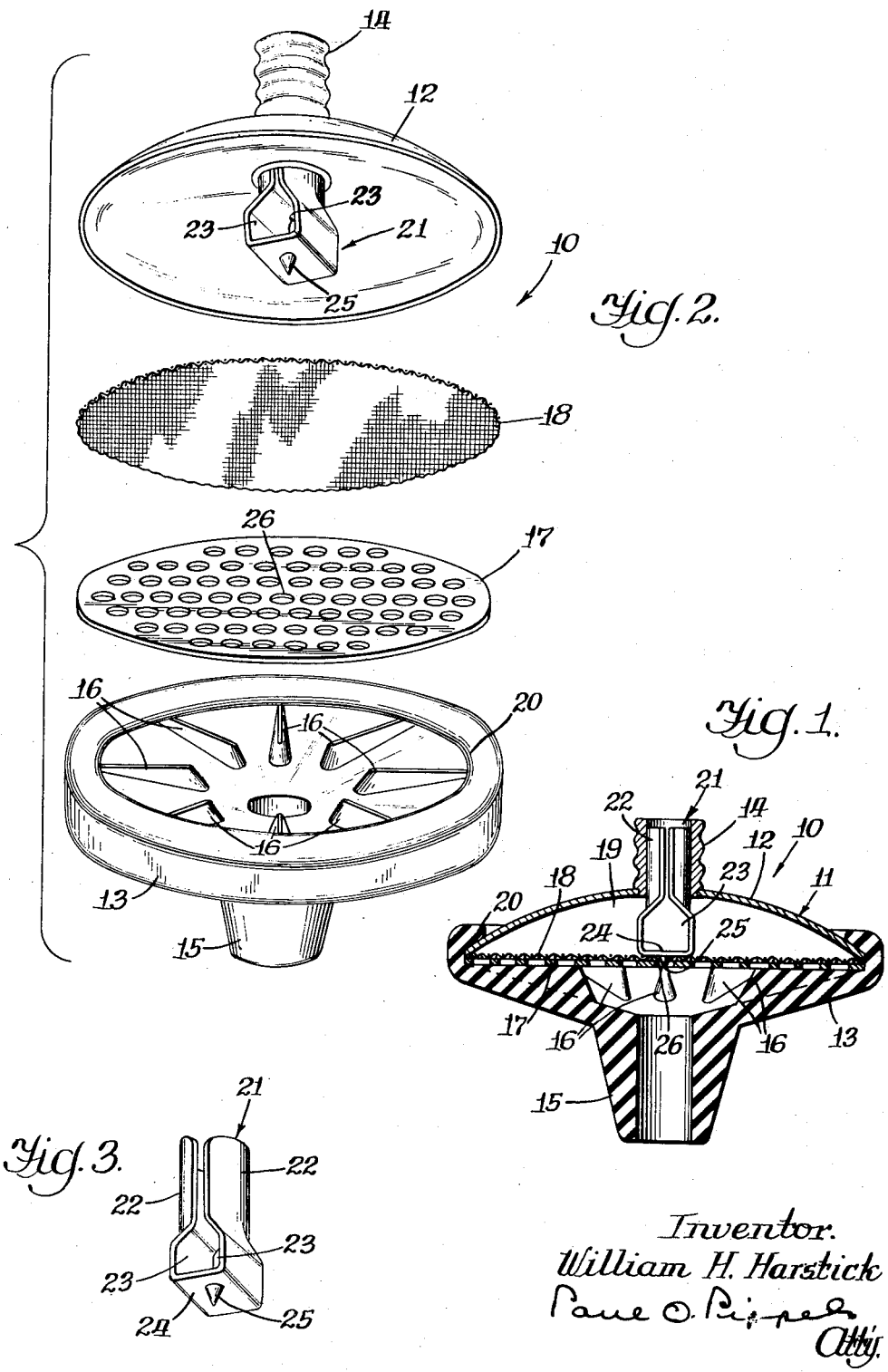
Inventor.
William H. Harstick
Paul O. Pippel
Atty.

Patented Jan. 5, 1954

2,665,009

UNITED STATES PATENT OFFICE

2,665,009

MILK STRAINER WITH REMOVABLE BAFFLE AND CENTERING DEVICE

William H. Harstick, Oak Park, Ill., assignor to International Harvester Company, a corporation of New Jersey Application June 30, 1951, Serial No. 234,487

4 Claims. (Cl. 210—158)

This invention relates to a strainer assembly. More specifically the invention relates to a strainer assembly having an improved filtering device adapted to be inserted in a vacuum system for filtering milk.

A prime object of the invention is to provide an improved strainer which is readily adapted for filtering milk as it comes from the animal, the strainer being quickly disassembled for washing purposes, and including a device for securing a flexible filtering pad in centered assembled relation.

A further object is to provide a strainer disk having a filtering chamber, the chamber including a flexible strainer pad which is transversely positioned within the chamber and including a baffling device for diverting the incoming stream of liquid to the entire area of the filtering pad, the baffling device being readily removable for washing purposes.

A still further object is the provision of a milk strainer having a flexible filtering pad disposed transversely within the strainer and including centering means adapted to engage and retain the filtering pad in centered relation during the assembly of the parts.

A still further object of the invention is to provide a strainer assembly having inlet and outlet conduits, the assembly including a transversely positioned flexible filtering pad which is seated upon a transversely extending perforated strainer disk, the strainer including a baffle and centering device adapted to be inserted in the inlet conduit in telescoping relation, the baffling and centering device engaging the flexible filtering pad for retaining the same position on the strainer disk against axial and transverse movement.

These and further objects will become more readily apparent upon a reading of the specification when taken in connection with the accompanying sheet of drawing.

In the drawing:

Figure 1 is a cross-sectional view in elevation through the improved strainer assembly.

Figure 2 is an exploded view showing the relative parts of a strainer assembly in perspective.

Figure 3 is a perspective view of a baffling and centering device utilized in the assembly shown in Figures 1 and 2.

Referring generally to Figures 1 and 2, a strainer assembly is generally designated by the reference character 10. The strainer assembly 10 includes a casing 11 consisting of an upper concave casing member 12 and a lower concave casing member 13. The upper concave casing member 12 is provided with an inlet conduit or connection 14, and the lower casing member 13 is provided with an outlet conduit or connection 15. The lower casing member 13, as best indicated in Figure 1, is formed of rubber or of a similar resilient material. The lower casing member 13 includes a plurality of upwardly extending supporting lugs 16 which as best shown in Figure 2 are spaced along the inner surface of the casing member in circumferential relation. A perforated metal strainer disk 17 is seated on the supporting lugs 16. A flexible filtering pad 18 is transversely positioned within a filtering chamber 19 formed by the upper and lower casing members 12 and 13 respectively. The pad 18 may consist of cotton batting or similar soft filtering material and the same is positioned or seated upon the strainer disk 17 as best indicated in Figure 1.

The lower casing member 13 is provided with an inwardly extending annular flange 20. The flange 20 is also of rubber like material and overlaps the outer peripheral edge portion of the upper casing member 12 for securing the casing members in clamping relation. As best shown in Figure 1 the outer peripheral edges of the strainer disk 17 and the pad 18 are clamped between the upper and lower casing members 12 and 13.

A baffle and centering member is indicated by the reference character 21. The baffle and centering member 21 is of cylindrical shape consisting of a pair of upwardly extending leg portions 22 suitably curved to conform to the inner wall of the inlet connections. The baffle and centering member 21 is provided at its lower end with a pair of oppositely disposed openings 23. The lower end of the baffle member 21 is provided with a flat baffle portion 24, the lower surface of which, as indicated in Figure 1, engages a central portion of the filtering pad 18 to retain the flexible pad in seating relation with respect to the strainer disk 17.

As best indicated in Figure 1, the legs 22 of the baffle member 21 are inserted into the inlet connection 14 in telescoping or mating relation. The legs 22 are formed of sheet metal having a spring-like resiliency, and since the outer diameter defined by the outer surfaces of the legs 22 is slightly larger than the inner diameter of the conduit 14, the legs 22 engage the conduit 14 in resilient clamping relation. The lower end of the baffle and centering member 21 has the openings 23 so disposed that as liquid enters into the conduit 14 and into the filtering chamber 19 the liquid impinges upon the baffle 24 and diverts the same radially outwardly within the chamber. Thus the central portion of the flexible pad 18 is protected from the direct impingement of the liquid as it enters into the strainer.

A conical dimple or projection 25 is formed on the underneath surface of the baffle 24. The projection 25 pierces the filtering pad 18 as indicated in Figure 1 and engages a centrally located perforation 26 in telescoping or mating relation.

During assembly, the strainer disk 17 is seated upon the resilient supporting lugs 16 and the filtering pad 18 is placed in seating relation of the strainer disk 17. The upper casing member 12 is thereupon placed over the filtering pad and the projection 25 immediately pierces the pad to hold the same against transverse displacement. Thus when the user flexes the flange 20 so that it engages the outer peripheral surface of the upper concave casing member, the filtering pad 18 is assured against any displacement by means of the projection 25 which has pierced the center portion of the pad.

During use of the strainer 10 the filtering pad 18 is held against relative transverse movement and also against vertical movement. In vacuum operated systems such as are generally utilized with milking systems, there is a certain amount of surge or vacuum fluctuation within the line. This strainer assembly is especially adapted for this type of filtering set up. The strainer pad is securely held centrally against fluctuations which might result from the vacuum system employed. Thus the pad is assured of being continual in the proper filtering position after the strainer has been assembled. The baffling and centering member 21 may be quickly and readily removed from its telescoping relation with respect to the conduit 14 for washing purposes.

It can now be seen that the objects of the invention have been fully achieved and that a novel strainer assembly especially adapted for milking machines has been provided. It must be understood that changes and modifications may be made which do not depart from the spirit of the invention as disclosed nor the scope thereof as defined in the appended claims.

What is claimed is:

1. A strainer assembly comprising first and second generally dish-shaped casing members, said casing members having peripheral edge portions clampingly connected in sealing relation to provide a filtering chamber, an inlet connection on said first casing member, an outlet connection on said second casing member, a strainer disk having a plurality of perforations formed therein, said strainer disk extending transversely within the filtering chamber between the inlet and outlet connections, a flexible filtering pad seated upon the strainer disk, said filtering pad having a peripheral edge portion secured between the peripheral edge portions of said first and second casing members, a baffle element within the filtering chamber, said baffle element having a generally flat portion seated on a central portion of the filtering pad for retaining said pad in seated relation on said strainer disk, a cylindrical portion connected to said flat portion, said cylindrical portion being removably positioned in the inlet connection in telescoping relation, the cylindrical portion having oppositely positioned openings for directing liquid to the filtering chamber, the flat portion being positioned in alignment with said inlet connection for deflecting the incoming liquid through said openings, and a projection on said flat portion, the projection extending through the filtering pad and engaging one of the perforations of said strainer element in mating relation for securing the filtering pad against transverse displacement.

2. A strainer assembly comprising first and second generally dish-shaped casing members, said casing members having peripheral edge portions, one of said edge portions comprising a rubber-like inwardly extending flange resiliently engaging the other edge portion whereby the casing members are clampingly connected in sealing relation to provide a filtering chamber, an inlet connection on said first casing member, an outlet connection on said second casing member, a strainer disk having a plurality of perforations formed therein, said strainer disk extending transversely within the filtering chamber between the inlet and outlet connections, a flexible filtering pad seated upon the strainer disk, said filtering pad having a peripheral edge portion secured between the peripheral edge portions of said first and second casing members, and a baffle element within the filtering chamber, said baffle element having a generally flat portion seated on a central portion of the filtering pad for retaining said pad in seated relation on said strainer disk, a projecting element on said flat portion, said projecting element extending through said filtering pad and engaging one of the perforations in said strainer disk in mating relation, a cylindrical portion connected to said flat portion, said cylindrical portion being connected to said first casing member, the cylindrical portion having oppositely positioned openings for directing liquid to the filtering chamber, the flat portion being positioned in alignment with said inlet connection for deflecting the incoming liquid through said openings.

3. A strainer assembly comprising first and second generally dish-shaped casing members, said casing members having peripheral edge portions, one of said edge portions comprising a rubber-like inwardly extending flange resiliently engaging the other edge portion whereby the casing members are clampingly connected in sealing relation to provide a filtering chamber, a tubular inlet connection on said first casing member, an outlet connection on said second casing member, axially extending resilient supporting members on said second casing member, said supporting members being circumferentially spaced and projecting into said filtering chamber, a strainer disk supported on the projections and extending transversely within the filtering chamber, a flexible strainer pad seated on said strainer disk, and a tubular member connected to said first casing member, said tubular member having a portion projecting into said filtering chamber and engaging said pad for urging the pad against the strainer disk, said projecting portion including an element connected to the projecting portion, extending through said strainer pad and engaging the strainer disk for maintaining said pad against lateral displacement, said telescoping member including an opening for directing liquid from the inlet connection to the filtering chamber.

4. A strainer assembly comprising first and second generally dish-shaped casing members, said casing members having peripheral edge portions, one of said edge portions comprising a rubber-like inwardly extending flange resiliently engaging the other edge portion whereby the casing members are clampingly connected in sealing relation to provide a filtering chamber, a tubular inlet connection on said first casing member, an outlet connection on said second casing member, axially extending resilient supporting members on said second casing member, said supporting member being circumferentially spaced and projecting into said filtering chamber, a strainer disk supported on the projections and extending transversely within the filtering chamber, a flexible strainer pad seated on said strainer disk, a tubular member telescopingly positioned within the tubular inlet connection, said telescoping tubular member having a portion projecting into said filtering chamber and engaging said pad for urging the pad against the strainer disk, said projecting portion including an element connected thereto, extending through said strainer pad and engaging said strainer disk for maintaining said pad against lateral displacement, and a baffle element on said tubular member, said baffle element being positioned to receive liquid from the inlet connection and to deflect the liquid radially outwardly within the filtering chamber.

WILLIAM H. HARSTICK.

References Cited in the file of this patent

UNITED STATES PATENTS

| Number | Name | Date |
|---|---|---|
| 321,228 | Law | June 30, 1885 |
| 1,172,938 | Buxton et al. | Feb. 22, 1916 |
| 1,749,730 | Kenney | Mar. 4, 1930 |
| 1,896,816 | Gottman | Feb. 7, 1933 |
| 2,400,719 | Stackhouse | May 21, 1946 |
| 2,516,102 | Brant | July 25, 1950 |
| 2,547,797 | Torrey et al. | Apr. 3, 1951 |
| 2,584,206 | Hodsdon | Feb. 5, 1952 |